United States Patent [19]
Knoth et al.

[11] Patent Number: 4,813,995
[45] Date of Patent: Mar. 21, 1989

[54] MANUFACTURING CONTAINERS OUT OF GLASS

[75] Inventors: Werner-Dieter Knoth, Essen, Fed. Rep. of Germany; Hermann H. Nebelung, Zurich, Switzerland

[73] Assignee: Emhart Industries, Inc., Farmington, Conn.

[21] Appl. No.: 157,079

[22] Filed: Feb. 8, 1988

Related U.S. Application Data

[63] Continuation of Ser. No. 945,191, Dec. 19, 1986, abandoned, which is a continuation of Ser. No. 821,514, Jan. 22, 1986, abandoned, which is a continuation of Ser. No. 572,343, Jan. 20, 1984, abandoned.

[30] Foreign Application Priority Data

Jan. 29, 1983 [GB] United Kingdom ............... 8302505

[51] Int. Cl.$^4$ ........................... C03B 9/34; C03B 9/36
[52] U.S. Cl. ........................................ 65/230; 65/267; 65/285; 65/84
[58] Field of Search ............... 65/63, 79, 80, 84, 230, 65/267, 285, 319, 348, 351, 88

[56] References Cited

U.S. PATENT DOCUMENTS

| | | | |
|---|---|---|---|
| 1,163,963 | 12/1915 | Woods | 65/80 |
| 2,030,328 | 2/1936 | Schutz | 65/348 |
| 3,001,329 | 9/1981 | Long | 65/79 |
| 3,015,911 | 1/1962 | Payne | 65/267 |
| 3,258,321 | 6/1966 | Wiley | 65/285 |

FOREIGN PATENT DOCUMENTS

| | | | |
|---|---|---|---|
| 284256 | 7/1971 | U.S.S.R. | 65/285 |
| 815548 | 6/1959 | United Kingdom | 65/230 |

*Primary Examiner*—Arthur Kellogg
*Attorney, Agent, or Firm*—Spencer T. Smith

[57] ABSTRACT

In an apparatus for manufacturing containers out of glass, a parison is formed from a gob of molten glass and is transferred to a mould having a cavity in the shape of the required container. Instead of the conventional blowing operation, the parison within the mould is heated so that the parison flows to conform to the shape of the cavity. The heating may be by a gas burner and air may be blown on to a neck portion of the parison to cool it during heating of the parison.

5 Claims, 5 Drawing Sheets

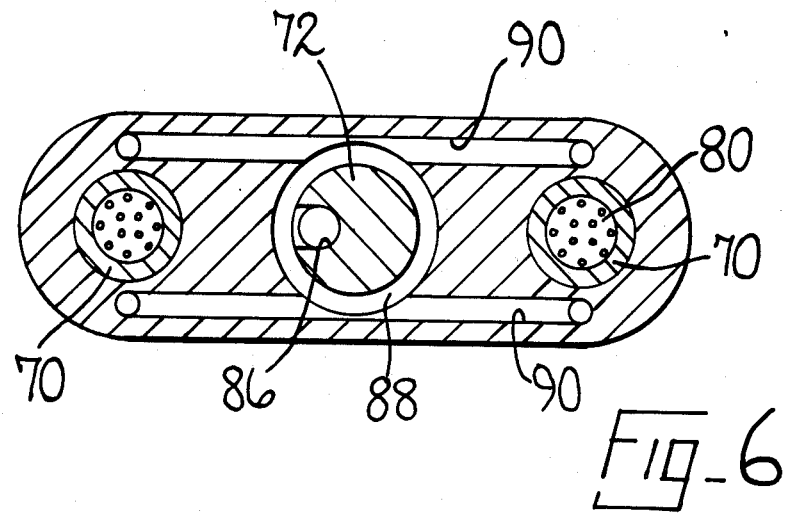
Fig_6
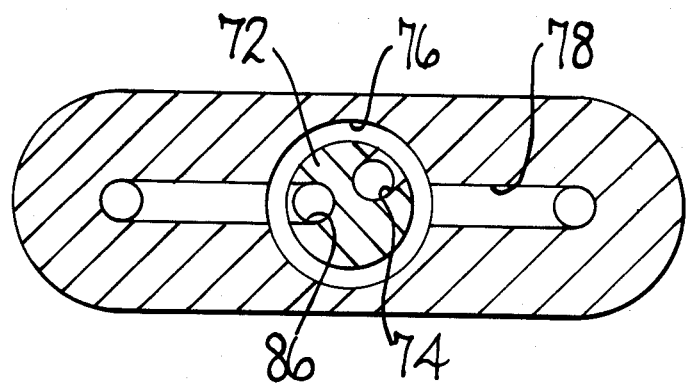
Fig_5

MANUFACTURING CONTAINERS OUT OF GLASS

This is a continuation of application Ser. No. 945,191, filed Dec. 19, 1986, now abandoned, which is a continuation of Ser. No. 821,514, filed Jan. 22, 1986, now abandoned, which is a continuation of Ser. No. 572,343, filed Jan. 20, 1984, now abandoned.

BACKGROUND OF THE INVENTION

This invention is concerned with apparatus for use in manufacturing containers out of glass, the apparatus comprising parison forming means operable to form a parison from a gob of molten glass, and transferring means operable to transfer a parison from the parison forming means to a mould cavity in the shape of the required container, the transferring means being arranged to position the parison so that it is suspended across an opening of the cavity. The invention is also concerned with a method of manufacturing containers out of glass comprising forming a parison from a gob of molten glass, and transferring the parison to a mould cavity in the shape of the required container so that the parison is suspended across an opening of the cavity.

In conventional apparatuses and methods for manufacturing containers out of glass, a gob of molten glass is formed by either a blowing or a pressing operation into a parison. When the parison has been formed, it is transferred, while supported by a divided ring (called a neckring) which grips a neck portion of the parison, to a mould in which the parison is blown to the required shape by the introduction of air under pressure into the parison. When the parison is formed, portions thereof which contact the forming elements become colder and therefore less viscous than the reminder of the parison and serve to retain the parison in shape as it is transferred. However, it is necessary for the parison to be of substantially uniform temperature for the final blowing to take place and, to achieve this, the colder portions of the parison are allowed to re-heat. This re-heating is achieved by allowing a period during which the remainder of the parison re-heats the colder portion thereof by a combination of conduction and radiation.

The above-described conventional apparatuses and methods for manufacturing containers are generally satisfactory where the container is to have a sufficiently thick wall that there is sufficient glass in the parison to allow self-re-heat as before described to take place. However, in the case of thin-walled containers, there may be insufficient glass present to allow such self-re-heating. It is possible to provide external heating for the parison as it is transferred to the mould but, if this is done, there is a risk of deformation of the parison before it reaches the mould and, since the parison's movement has to be stopped to enable it to be heated, the speed of manufacture is reduced. With conventional apparatuses and methods, it is not possible to produce thin-walled containers whose walls have a uniform thickness around the container. Accordingly, in order to provide sufficient strength for the containers more glass has to be included than would otherwise be the case.

It is an object of the present invention to provide an improved apparatus with which containers having thin walls can be efficiently manufactured.

It is a further object of the present invention to provide an improved method by which containers having thin walls can be manufactured.

BRIEF SUMMARY OF THE INVENTION

The invention provides apparatus for use in manufacturing containers out of glass, the apparatus comprising parison forming means operable to form a parison from a gob of molten glass, the transferring means operable to transfer a parison from the parison forming means to a mould cavity in a shape of the required container, the transferring means being arranged to position the parison so that it is suspended across an opening of the cavity, the apparatus also comprising heating means operable to heat the parison while it is suspended as aforesaid to cause the parison to flow to conform to the shape of the cavity.

As the conventional blowing of the parison is omitted in an apparatus in accordance with the last preceding paragraph, it is possible to heat the parison within the mould which would not be possible in a conventional apparatus because the parison is entirely enclosed by the mould and a blow head delivering blowing air to the interior of the parison. In an apparatus in accordance with the last preceding paragraph, no blow head is present and its place is taken by heating means. The parison is transferred to the mould without being externally heated as it is transferred and therefore delay and risk of deformed parisons is reduced.

In order to ensure that the heating means does not obstruct supply of parisons to the mould cavity or removal of containers from the mould cavity, the apparatus may comprise moving means operable to move the heating means between an out-of-the-way position thereof in which the heating means does not obstruct supply of parisons to the mould cavity or removal of containers from the mould cavity and an operative position thereof in which the heating means heats the parison in the mould cavity. The heating means may conveniently comprise a gas burner.

In order to ensure that the parison does not collapse to the bottom of the mould cavity due to the flowing of the neck portion of the parison by which it is suspended, the apparatus may comprise cooling means operable to cool the neck portion of the parison by which it is supported in the mould cavity while the parison is heated by the heating means. Conveniently the cooling means may comprise a ring of nozzles by which jets of cooling air are directed on to the neck portion of the parison. Where the heating means of the apparatus comprises a gas burner movable by moving means between an out-of-the-way position thereof and an operative position thereof, the ring of nozzles may be distributed around the gas burner and be also movable by the moving means.

Whereas the parisons blown in conventional apparatuses and methods are generally cylindrical enclosing a considerable volume into which air under pressure is introduced, parisons used in an apparatus in accordance with the invention are conveniently dishshaped so that central regions of the parison can be conveniently heated before the parison flows. These dish-shaped parisons may be conveniently formed by parison forming means comprising a plunger having an upper surface on which a gob of molten glass can be received, a neck ring disposed around the plunger, a one-piece mould arranged to be positioned on the neck ring above the upper suface of the plunger after a gob has been received as aforesaid, and plunger moving means operable to move the plunger upwards so that the gob is shaped into a parison between the mould and the plunger, the neck ring being arranged to support the parison after withdrawal of the mould and plunger from the parison and being movable by the transferring means to position the parison in the mould cavity. In order to stabilise the parison before it is transferred to the mould cavity, the apparatus may comprise blowing means operable, after the withdrawal of the mould and plunger from the parison, to blow air into the parison to cause it to expand. In order to prevent the parison from collapsing when the plunger is withdrawn therefrom due to vacuum created in the space between the plunger and the parison, the neck ring may be provided with passages through which air can enter the space between the plunger and the parison as the plunger is withdrawn from the parison.

The invention also provides a method of manufacturing containers out of glass comprising forming a parison from a gob of molten glass, and transferring the parison to a mould cavity in the shape of the required container, characterised in that the parison is suspended across an opening of the cavity, and the parison is heated while it is suspended as aforesaid so that the parison flows to conform to the shape of the cavity.

In a method according to the last preceding paragraph, a neck portion of the parison by which it is suspended across the opening may be cooled during heating of the parison to prevent the neck portion from flowing and causing the collapse of the parison to the bottom of the mould cavity. The cooling of the neck portion may be by air jets which are directed on to the neck portion.

Conveniently, in a method in accordance with the last preceding paragraph but one, the heating may be by a gas burner which is moved between an out-of-the-way position thereof in which it does not obstruct supply of parisons to the mould cavity or removal of containers from the mould and an operative position thereof in which flames of the burner play upon the parison in the mould cavity. Conveniently, the quantity of heat supplied to the parison may be controlled by controlling the length of time that the burner remains in its operative position, or by the volume of gas supplied.

BRIEF DESCRIPTION OF THE DRAWINGS

There now follows a detailed description, to be read with reference to the accompanying drawings, of an apparatus for use in manufacturing containers out of glass and a method of manufacturing such containers, the apparatus and method being illustrative of the invention. It is to be understood that the illustrative apparatus and the illustrative method have been selected for description by way of example and not of limitation of the invention.

In the drawings:

FIGS. 5 and 6 are cross-sectional views taken on the line V—V and VI—VI respectively in FIG. 4.

DETAILED DESCRIPTION OF PREFERRED EMBODIMENT OF THE INVENTION

The illustrative apparatus is for manufacturing containers out of glass and comprises parison forming means operable to form parison P from a gob of molten glass G. The parison forming means of the illustrative apparatus is shown in FIGS. 1, 2 and 3, FIG. 1 showing an initial stage in the formation of the parison P, Figure 2 an intermediate stage in the formation of the parison, and FIG. 3 a final stage in the formation of the parison P.

Figure 1:
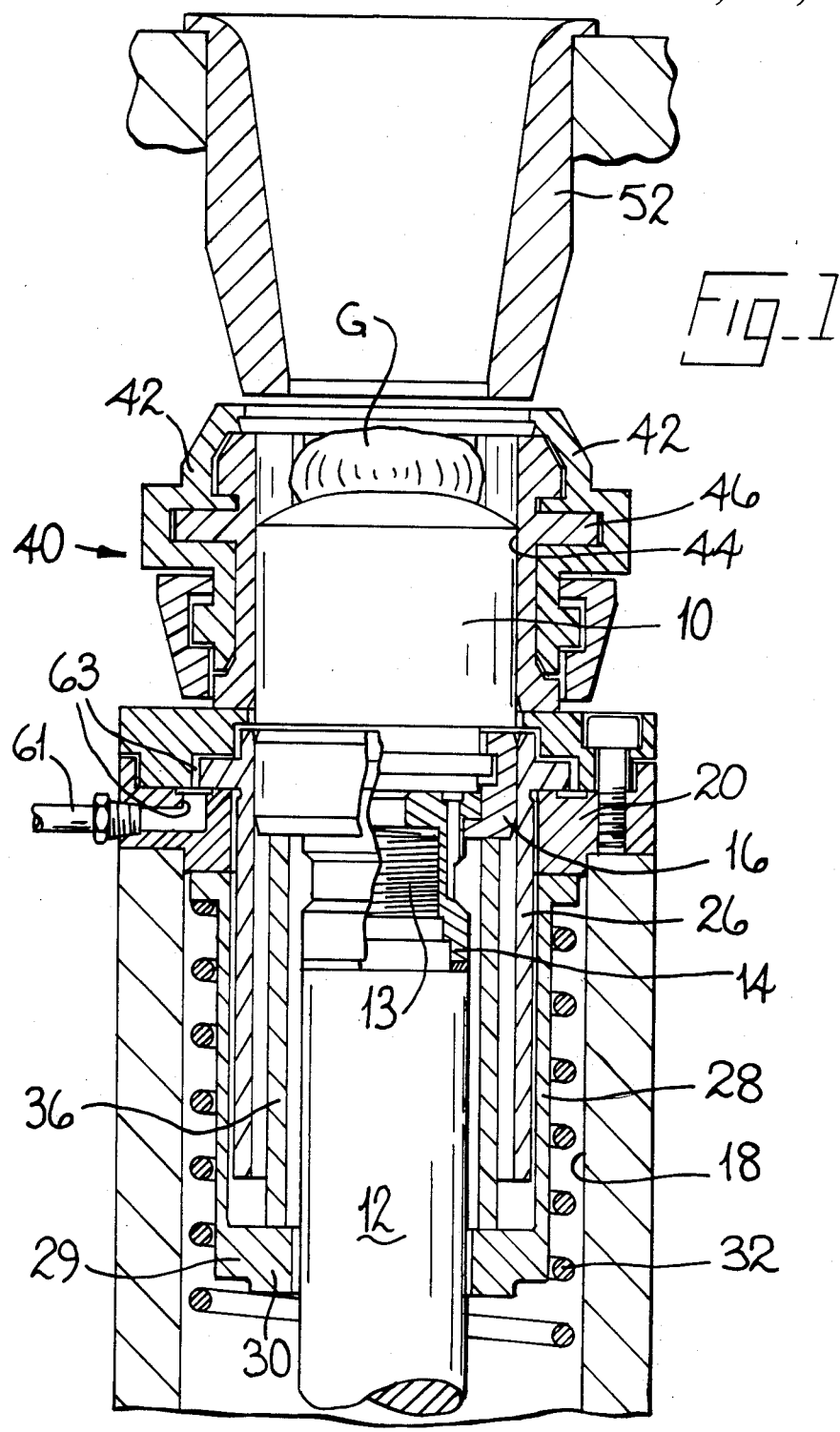
FIGS. 1, 2 and 3 are cross-sectional views of parison forming means of the illustrative apparatus, illustrating successive stages of the illustrative method.
Figure 2:
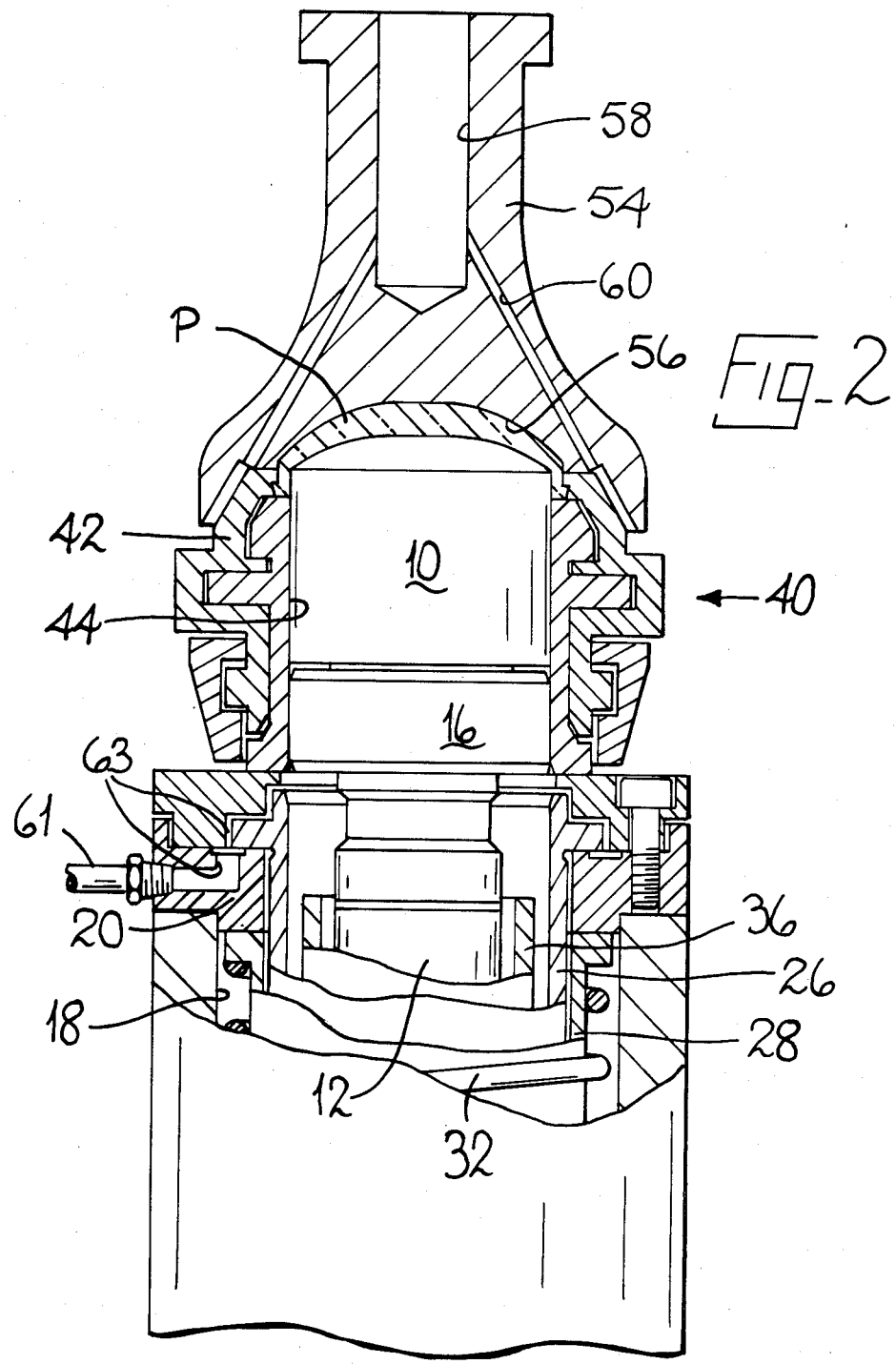
Figure 3:
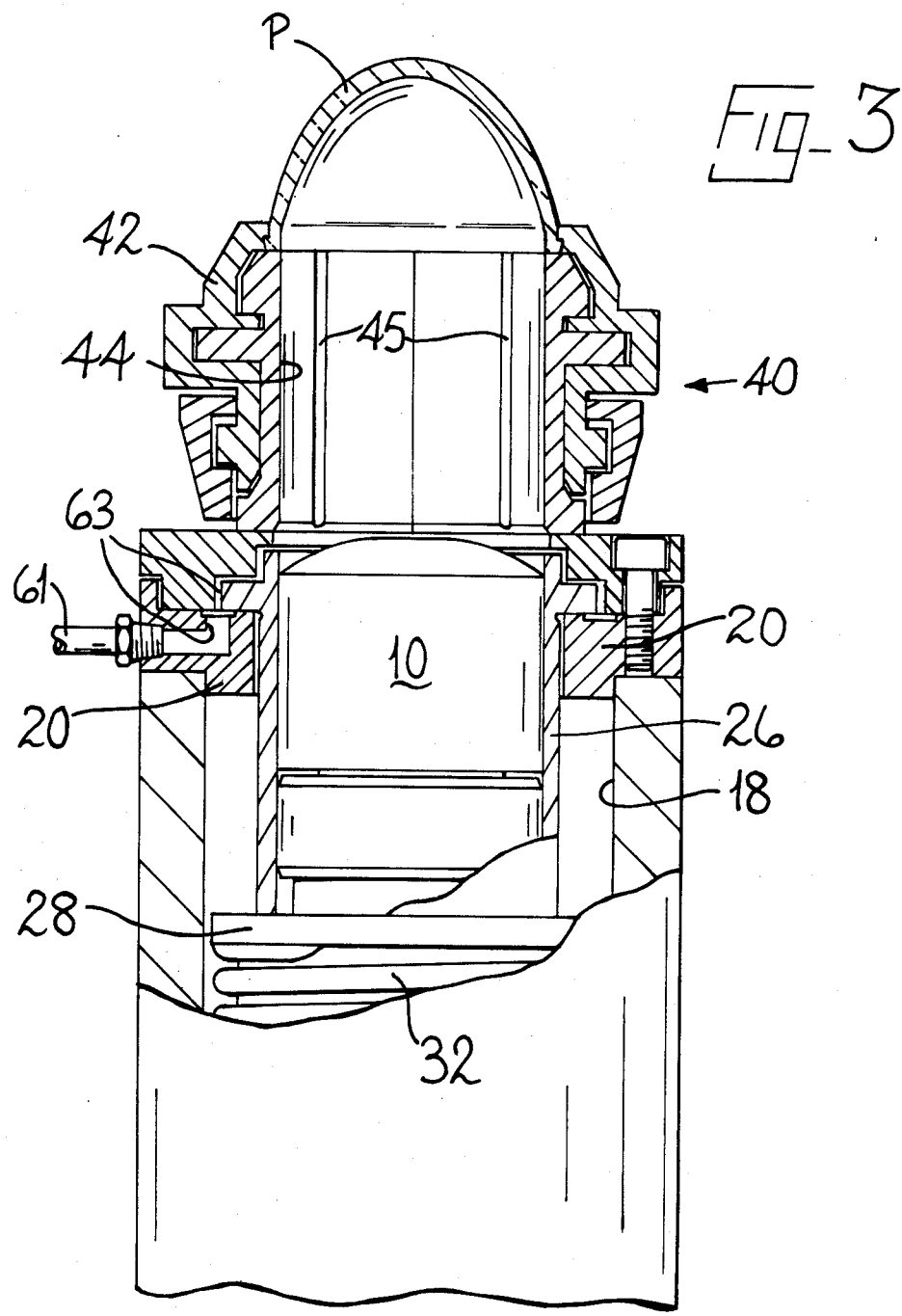

The parison-forming means shown in FIGS. 1, 2 and 3 comprises a plunger 10 which is mounted on top of a vertically-extending piston rod 12. The piston rod 12 has an upper screw-threaded boss portion 13 on which a clamping collar 14 is threadedly received and a clamping ring 16 clamps the plunger 10 to the clamping collar 14. The piston rod 12 extends from the piston of a hydraulic piston and cylinder assembly (not shown) which is operable to move the plunger 10 vertically upwards or downwards. The piston rod 12 is contained within a hollow cylinder 18 which has an upper end cap 20 through which a circular hole passes to allow the plunger 10 to pass through the cap 20. The end cap 20 supports a sleeve 26 within the cylinder 18 through which sleeve 26 the plunger 10 is movable. A sleeve 28 is movable in the annular space between the cylinder 18 and the sleeve 26 and is attached, by connectors 29 which pass through longitudinal slots (not shown) in the sleeve 26 to a ring 30 which surrounds the piston rod 12 and is slideable longitudinally thereon. The sleeve 28 is urged towards the end cap 20 by a compression spring 32 but its movement is limited by engagement of the top of the sleeve 28 with an adjustable stop screw (not shown) carried by the end cap 20. The annular space between the piston rod 12 and the sleeve 26 contains a spacing ring 36 which rests on the ring 30 and is engageable with the clamping ring 16.

When the hydraulic piston and cylinder assembly is used to move the plunger 10 downwards, the clamping ring 16 engages the spacing ring 36 and pushes it and the ring 30 downwards; this movement causes the sleeve 28 to compress the spring 32. The plunger is then in an out-of-the-way position in which it is shown in FIG. 3. Upon removal of the supply of hydraulic fluid under pressure from the piston and cylinder assembly, the spring 32 moves the sleeve 28 and the ring 30 upwardly until the sleeve 28 engages the aforementioned stop screw. As the ring 30 moves, it pushes with it the spacing ring 36, the clamping collar 14, and the plunger 10. This brings the plunger 10 to a gob-receiving position thereof shown in FIG. 1. When hydraulic fluid under pressure is introduced into the piston and cylinder assembly to move the piston rod 12 upwardly, the piston rod 12 moves upwardly leaving the ring 30 behind and brings the plunger 10 to a pressing position thereof shown in FIG. 2.

The illustrative apparatus also comprises transferring means operable to transfer a parison P from the parison forming means to a mould cavity in the shape of the required container. The transferring means comprises a neckring arrangement 40 (see FIGS. 1, 2 and 3) which comprises two relatively movable jaws 42 which are arranged to grip a parison by a neck portion thereof and to release the neck portion when required. The neckring arrangement 40 also comprises a cylindrical plunger guide 44 on an external flange 46 of which the jaws 42 are slideable. The neckring arrangement 40 is mounted on inverting means of the transferring means (not shown) of conventional construction which is arranged to position the arrangement 40 on the plunger 10 so that the plunger 10 can extend into the plunger guide 44.

The inverting means is also operative to swing the neckring arrangement 40 about a horizontal axis (not shown) so that a parison P gripped by the jaws 42 is transferred to a mould 50 (see FIG. 4) to be described hereinafter with the parison P being inverted as it is transferred.

The parison forming means of the illustrative apparatus also comprises a funnel 52 (see FIG. 1) which is mounted on funnel moving means (not shown) for movement between an operative position thereof in which the funnel 52 can direct gobs G on to an upper surface of the plunger 10 and an out-of-the-way position thereof. The funnel moving means is of conventional construction such as is well known in glass container manufacturing machines of the so-called I.S. type.

The parison forming means of the illustrative apparatus also comprises a mould 54 which is movable by mould moving means (not shown) between an operative position thereof (shown in FIG. 2) in which a cavity 56 of the mould 54 which opens from the bottom of the mould 54 is aligned with the plunger 10 and an out-of-the-way position thereof. The mould moving means may be identical in construction to the funnel moving means mentioned above. The mould 54 has an internal cavity 58 to which cooling air is supplied. The cooling air leaves the chamber 58 through cylindrical passages 60 formed in the mould 54 so that the mould 54 is cooled thereby and can be maintained at a desired temperature.

In the use of the illustrative apparatus in the illustrative method, the neckring arrangement 40 is positioned in alignment with the plunger 10 and the plunger 10 is moved into its gob-receiving position within the plunger guide 44. The funnel 52 is moved into its operative position and a gob G is dropped through the funnel 52 and is received on the upper surface of the plunger 10 (this condition is shown in FIG. 1). Next, the funnel 52 is moved to its out-of-the-way position and the mould 54 is moved into its operative position. The plunger 10 is now moved into its pressing position by operation of the hydraulic piston and cylinder assembly. This causes the gob G to be pressed into the cavity 56 of the mould 54 forming a parison P whose neck portion is in engagement with the jaws 42 of the neckring arrangement 40 (this condition is shown in FIG. 2). When the parison P has been formed, the plunger 10 is withdrawn by operation of the hydraulic piston and cylinder assembly to its out-of-the-way position and the mould 54 is removed to its out-of-the-way position by vertical movement away from the parison P. As the plunger 10 leaves the parison P, air enters the space between the parison P and the plunger 10 through passages provided in the neckring arrangement 40 by vertically extending grooves 45 formed in the gob guide 44. This ensures that the parison is not sucked downwards with the plunger 10. When the plunger 10 has reached its out-of-the-way position, air under pressure is introduced into the parison P through an air pipe 61 which communicates with the interior of the plunger guide 44 through passages 63 in the end cap 20 of the cylinder 18. Thus, the illustrative apparatus comprises blowing means operable, after the withdrawal of the mould 54 and the plunger 10 from the parison P, to blow air on to the parison P. This air causes the parison P to expand as will be apparent from a comparison of FIG. 2 with FIG. 3 which shows the condition at this stage in the illustrative method.

Figure 4:
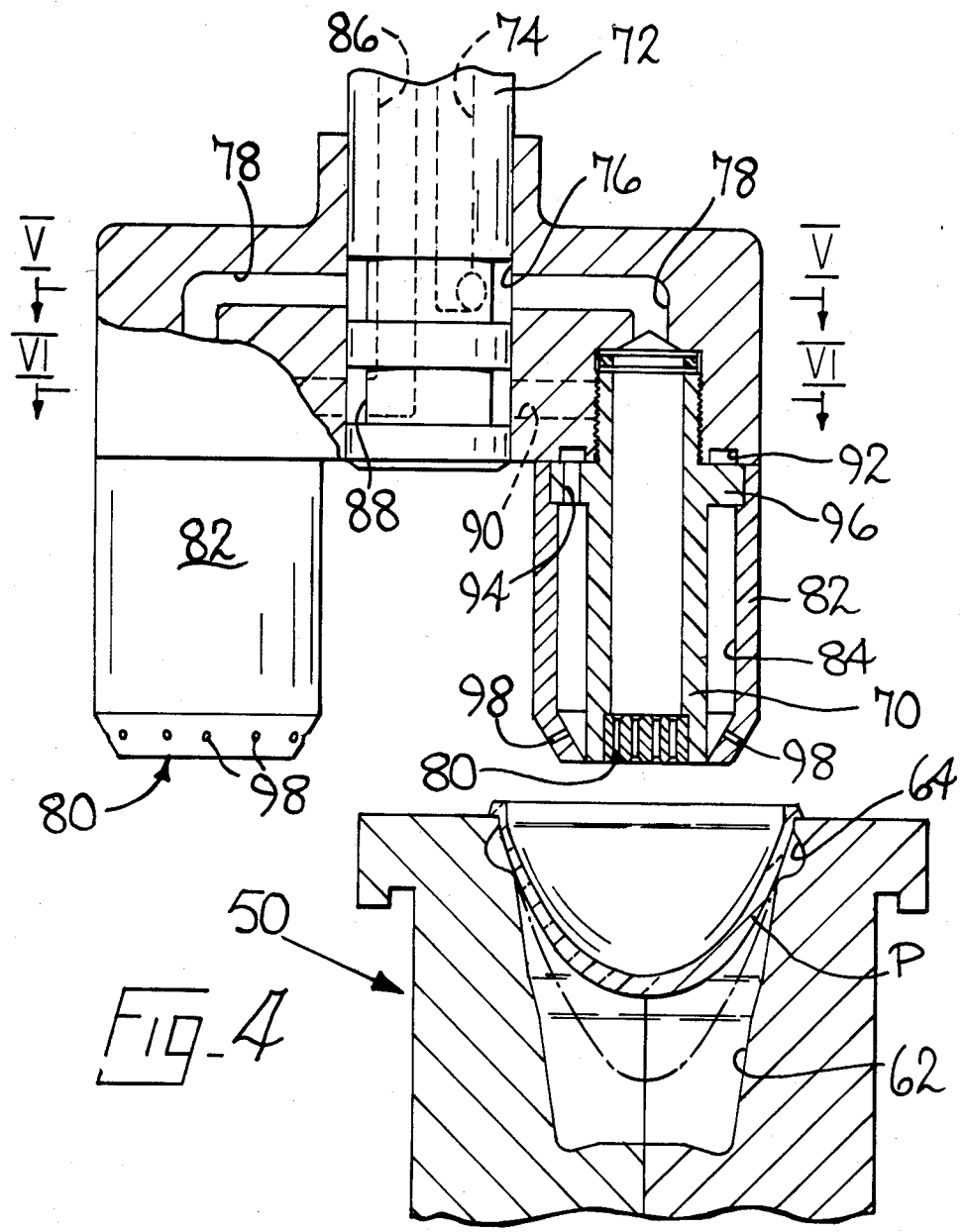
FIG. 4 is a cross-sectional view of a portion of the illustrative apparatus which is used in forming a parison into a container, illustrating a further stage of the illustrative method.

Next in the operation of the illustrative apparatus in the illustrative method, the transferring means is operated to cause the neckring arrangement 40 to transfer the parison P to the mould 50 which is shown in FIG. 4. When the parison P has been transferred to the mould 50 which has a cavity 62 in the shape of the required container, the parison P is released by the jaws 42 so that the parison P is suspended across an opening 64 of the cavity 62 and the neckring arrangement 40 is returned to alignment with the plunger 10 by operation of the inverting means leaving the parison P suspended across the opening 64.

The illustrative apparatus also comprises heating means operable to heat the parison P while it is suspended as aforesaid across the opening 64 to cause the parison P to flow to conform to the shape of the cavity 62. The heating means is movable by moving means of the illustrative apparatus between an out-of-the-way position thereof (not shown) in which the heating means does not obstruct supply of parisons P to the mould cavity 62 or removal of finished containers from the mould cavity 62 and an operative position thereof in which the heating means heats a parison P in the mould cavity 62. The moving means of the illustrative apparatus may be identical in construction to the moving means used in conventional I.S. type machines for moving the blow heads thereof.

The heating means of the illustrative apparatus comprises a gas burner 70 which, when in its operative position, has flames (not shown) which play upon central regions of the parison P in the mould 50. The burner 70 is mounted on a support 72 which is in turn mounted on the moving means therefor. As shown in FIG. 4, two burners 70 may be mounted on the same support 72 so that parisons P in two adjacent moulds 50 (only one shown in FIG. 4) may be heated simultaneously. The burner 70 burns a mixture of inflammable gas and air which is supplied through a bore 74 in the support 72 to an annular chamber 76 from which the mixture passes along a passage 78 to the burner 70 which has a plurality of passages 80 through which the mixture leaves the burner 70 and is ignited as it does so. The amount of heating applied to the parison P is controlled by the length of time during which the flames play on the parison P and when this time has passed the burner 70 is removed to its out-of-the-way position. When in its out-of-the-way position, the pressure of the air and gas mixture may be reduced so that the flames of the burner are just kept burning so that the use of gas is made more economical.

A sleeve 82 supported by the support 72 forms an annular plenum chamber 84 around the burner 70. This plenum chamber 84 is supplied with air through a bore 86 in the support 72 which supplies air to an annular chamber 88 from which the air passes through a passage 90 to an annular chamber 92. From the annular chamber 92, the air passes through a passage 94 formed in an external flange 96 by which the burner is attached to the support 72 and enters the chamber 84. When the burner 70 is in its operative position, air under pressure supplied by blowing means (not shown) to the bore 86 passes into the plenum chamber 84 and leaves through a ring of nozzles 98 formed so that they direct jets of cooling air on to the neck portion of the parison P. Thus, the neck portion of the parison P is cooled so as to prevent it from flowing and thereby to prevent the parison P from collapsing to the bottom of the mould 50 due to flowing of the neck portion thereof.

During the heating of the parison P, vacuum can be applied to the cavity 62 by sucking air out of the cavity 62, through small diameter passages (not shown) in the mould 50 in a manner which is conventional in blowing parisons. When sufficient heat has been supplied to the parison P, the burner 70 may be removed to its out-of-the-way position and replaced by a conventional blow-head (not shown) which blows air into the parison P to assist it in conforming to the shape of the cavity 62.

When the parison has flowed to the shape of the mould cavity 62, the mould 50, which is divided into two halves, is opened so that the container formed from the parison P may be removed from the cavity 62 by conventional take-out means. In the illustrative method, containers having thin walls can be efficiently manufactured since the parison P does not have to pause to be externally re-heated as it is transferred to the mould 50 and, therefore, is unlikely to have become deformed before it reaches the mould 50.

We claim:

1. An apparatus for use in manufacturing containers out of glass comprising:
    parison forming means including blank mold means operable to form a parison from a gob of molten glass,
    a finish mold having a cavity having the shape of the container,
    transfer means for gripping the annular neck portion of the parison and transferring the parison from the parison forming means to said finish mold where the annular parison neck portion is supported by the upper peripheral edge portion of the finish mold cavity and the remaining entire body portion of the parison is spaced from said finish mold cavity,
    heating means including a head selectively sized to direct heat towards the entire body portion of the parison when it is located at a selected location above said finish mold so that the entire body portion of the parison will be reheated to flow towards said finish mold cavity which is spaced therefrom, and
    means for supporting said heating means at said selected location.

2. Apparatus according to claim 1 wherein the heating means further comprises cooling means operable to cool the neck portion of the parison by which said parison is supported in the mould cavity while the parison is heated by the heating means.

3. Apparatus according to claim 2 wherein the cooling means comprises a ring of nozzles by which jets of cooling air are directed on to the neck portion of the parison.

4. Apparatus according to claim 3 in which the heating means comprises a gas burner which is movable between an out-of-the-way position thereof and an operative position thereof, and wherein the a ring of nozzles is distributed around the gas burner and is also movable with said gas burner.

5. An apparatus according to claim 1, wherein said heating means comprises a gas burner.

* * * * *